United States Patent [19]

Messier et al.

[11] Patent Number: 4,609,631

[45] Date of Patent: Sep. 2, 1986

[54] OXYNITRIDE GLASS FIBERS

[75] Inventors: Donald R. Messier, Burlington; Eileen J. DeGuire, Cambridge; R. Nathan Katz, Natick, all of Mass.

[73] Assignee: The United States of America as represented by the Secretary of the Army, Washington, D.C.

[21] Appl. No.: 775,076

[22] Filed: Sep. 12, 1985

[51] Int. Cl.$^4$ .......................... C03C 13/00; C03C 3/11
[52] U.S. Cl. .......................................... 501/35; 501/56
[58] Field of Search .............................. 501/35, 56, 96

[56] References Cited

U.S. PATENT DOCUMENTS

| | | | |
|---|---|---|---|
| 3,360,386 | 12/1967 | Kelly et al. | 501/35 |
| 3,620,787 | 11/1971 | McMarlin | 501/35 |
| 3,785,836 | 1/1974 | Bacon | 501/35 |
| 3,999,835 | 12/1976 | Newns et al. | 501/56 |
| 4,186,021 | 1/1980 | Chyung et al. | 501/4 |
| 4,203,744 | 5/1980 | Schultz et al. | 65/3.11 |

OTHER PUBLICATIONS

Hampshire et al., Oxynitride Glasses, Physics and Chemistry of Glasses, vol. 26, No. 5, (Oct. 1985) pp. 182–186.
Homeny et al., Preparation and Mechanical Properties of Mg-Al-Si-O-N Glasses, J. Amer. Ceramic Society, (Nov. 1984), p. C-225-227.
Shillito, Wills and Bennett, Silicon Metal Oxynitride Glasses, J. Amer. Ceramic Soc., vol. 61, No. 11-12 (Nov.-Dec. 1978) p. 537.
Messier and Broz, Microhardness and Elastic Moduli of Si-Y-Al-O-N Glasses, J. Amer. Ceramic Soc., vol. 65, No. 8 (Aug. 1982) p. C-123.
Loehman, Preparation and Properties of Y-Si-Al-O-N Glasses, J. Amer. Ceramic Soc., vol. 62, No. 9, Sep.-Oct. 1979, pp. 491-495.

Primary Examiner—William R. Dixon, Jr.
Assistant Examiner—Kathleen E. Crotty
Attorney, Agent, or Firm—Mark Goldberg; Anthony T. Lane; Robert P. Gibson

[57] ABSTRACT

This invention relates to the production of high elastic modulus, high strength, corrosion-resistant oxynitride glass fibers for improved fiber-reinforced composites. The incorporation of nitrogen into silicon-yttrium-aluminum oxide glasses enhances the properties of bulk glass. This invention is the first demonstration that such glasses can be made into fibers. The addition of nitrogen to practically any oxide glass fiber composition will produce improvements in properties similar to those shown for the silicon-yttrium-aluminum system.

5 Claims, 2 Drawing Figures

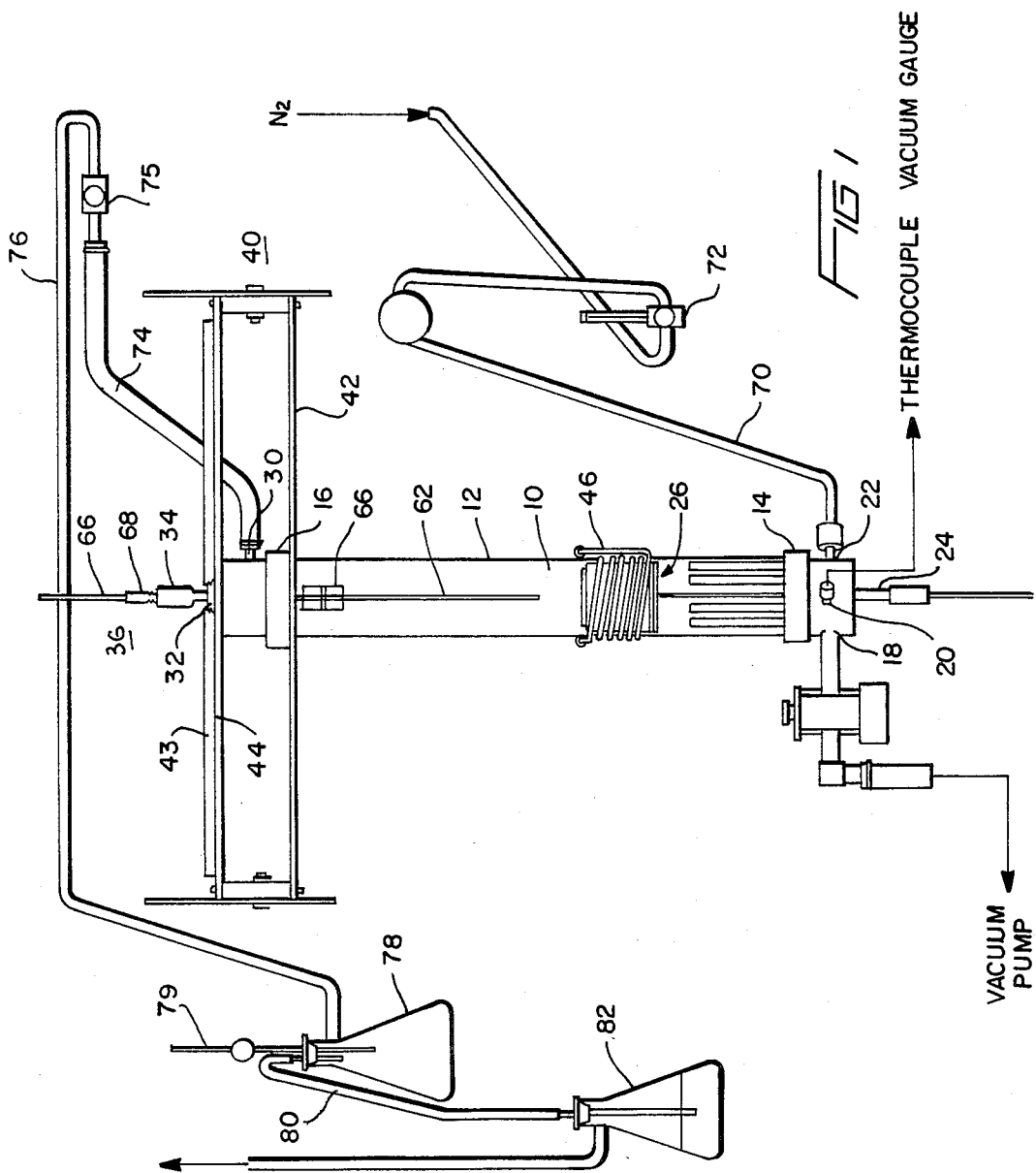

OXYNITRIDE GLASS FIBERS

The invention described herein may be manufactured, used and licensed by or for the Government for Governmental purposes without the payment to us of any royalty thereon.

BACKGROUND OF THE INVENTION

The preparaton of glasses in the system Si—Y—Al—O—N has been reported by several investigators. *J.Am.CeramicSoc.* 65 [8] C-123 (1982).

To form such glasses, powdered alumina, silicon nitride, silicon dioxide, and yttrium oxide are weighed and then mixed, as by tumbling in a plastic container. The powder mixture is then compacted by isostatic pressing to form pellets. These pellets are then loaded into boron nitride-lined crucibles. The powder mixture is then melted in a nitrogen atmosphere at 100 kPa. Typically, the melting temperature is in excess of 1600° C., and the melting time required is two to four hours. The melt is furnace-cooled to room temperature as fast as is practicable, and, for large (>50 g) batches, reheated to about 700° C. for two hours for annealing.

The preferred raw materials, with the approximate preferred purity for each, are as follows. 99.995% Alpha $Al_2O_3$, Gallard-Schlesinger Corp., Carle Place, N.Y.; AME CP 85 $Si_3N_4$, Advanced Materials Engineering, Gateshead, Durham, U.K.; 99.5% high-purity fused $SiO_2$, Thermo-Materials Corp., Atlanta, Ga., and 99.9% $Y_2O_3$, Molycorp, N.Y.

Such glasses typically have high elastic moduli. These glasses also demonstrate an increase in glass hardness with increasing nitrogen content. Similarly, the glass transition temperature and viscosity increase with increasing nitrogen content.

All of these observations support the theory that the replacement of oxygen with nitrogen in the glass structure leads to a tightening of the glass network by means of the formation of more bonds than would be present in a similar oxide glass.

Previous investigations of such glasses have been confined to the production of cylindrical ingots and disks. The properties of these glasses have been investigated in part because of the recent developments in heat engine technology, which have stimulated interest in a variety of ceramic materials for high-temperature structural applications. *Ceramic Eng. and Sci. Proc.* 3, 565–576 (1982).

SUMMARY OF THE INVENTION

This invention relates to the discovery that oxynitride glass compositions can be drawn into glass fibers which possess essentially the same high elastic moduli, excellent corrosion resistance, high strength and hardness of the bulk glass. Such fibers are useful in resin matrix compositions.

While the invention is illustrated hereinafter with reference to preferred fiber compositions of Si—Y—Al—O—N glasses, the invention is generally applicable to glasses where nitrogen has replaced oxygen in the glass structure.

BRIEF DESCRIPTION OF THE DRAWING

FIG. 1 is a schematic side elevation of the apparatus that is used for pulling fibers from nitrogen-substituted glass, and FIG. 2 is a fragmentary section in a vertical plane, in the plane of the paper, of the crucible assembly on an enlarged scale.

DETAILED DESCRIPTION OF THE INVENTION

This invention is concerned with high elastic modulus, high strength improved glass fibers. The elastic modulus and strength of these glass fibers are improved by the replacement of oxygen in the glass by nitrogen. The resulting observed improvements in properties indicate that such fibers could find use in many applications, including high strength resin matrix composites.

In a preferred embodiment of the invention, the fibers are made from glasses containing up to about 15 atomic percent nitrogen. The glasses are formed by a process in which a powdered component mixture is melted in a nitrogen atmosphere, at temperatures from 1500° C. to 1700° C. or higher. The fibers are either pulled from glass that has been remelted in a nitrogen or inert atmosphere furnace, or are drawn in air from glass pieces melted with an oxyacetylene torch. These techniques may be manual, to demonstrate the invention. For commercial operations, less expensive and more sophisticated fiber drawing techniques would be used.

While fibers can be made from many glass compositions containing nitrogen in the glass structure in place of the usual oxygen, the invention is illustrated and demonstrated by reference to three particular glasses. The chemical compositions of these three glasses are reported below in Table 1. The raw batches for forming the glasses reported in Table 1 may be made up from mixtures of powders selected to produce the desired ultimate composition. For example, a raw batch may be made up from alumina, silicon nitride, silicon dioxide, and yttrium oxide ($Al_2O_3$, $Si_3N_4$, $SiO_2$, and $Y_2O_3$), or, for example, from aluminum nitride, silicon dioxide, and yttrium oxide (AlN, $SiO_2$, and $Y_2O_3$).

To demonstrate the invention on a laboratory scale, a weighed powder raw batch, up to about 200 grams, is mixed in a polyethylene container. Preferably, three or four balls of alumina are used in the container to promote mixing. The mixed powder is then consolidated by isostatic pressing in a latex bag to form one or more slugs, using a pressure of about 140 MPa (20,000 psi). The slugs are then broken into coarse chunks for melting.

Melting may be done in a screw-top graphite crucible that is coated internally with a layer of boron nitride powder. A preferred batch size is 50–75 grams, an amount that was found to be useful in the particular glass preparation system used in the demonstrations of the invention described below. Melting was done in nitrogen at 200 kPa (28 psia). Melting was accomplished by heating the batch and holding it at the desired temperature, quenching to room temperature, then heating again and holding at the annealing temperature, then slowly cooling to room temperature. The specific melting conditions for the three compositions reported in Table 1 are reported in Table 2.

Referring now in detail to the drawing by numerals of reference, one form of apparatus that may be used for fiber-pulling is illustrated in FIGS. 1 and 2. An atomsphere of nitrogen or argon is preferably used.

This apparatus includes an induction furnace chamber 10 that is provided within a fused silica tube 12. Two brass end caps 14 and 16, respectively, are mounted on the opposite ends of the fused silica tube 12.

These end caps function to maintain the atmosphere within the chamber 10, and also provide access to the chamber for loading and unloading.

The lower end cap 14 is provided with a port 18 that is connected to a vacuum pump (not shown), and with another port 20 through which pressure measurements may be taken. The lower end cap 14 is also provided with a port 22 for admitting inert gas, and with a support structure 24 that projects above and below the end cap 14, for holding a vertically adjustable furnace 26.

The upper end cap 16 has three ports, including a port 30 through which gas can discharge, a port 32 for a fused silica pyrometer sighting window, and a third port 34 through which a dipstick (part of assembly 36) is passed that is used for pulling flibers (in a manner to be described presently).

The entire structure may be supported from an aluminum bracket generally denoted by the numeral 40, which is provided with a lower plate 42 and an upper plate 44. The lower face of the upper end cap 16 rests on the lower plate 42 of the bracket, and the upper plate 44 bears against the top of the end cap 16, to hold the end cap in place in case of a slight excess of gas pressure in the system. In addition, the bracket structure serves to protect the silica tube 12 from mechanical damage during the fiber pulling operation. Preferably, both end caps are provided with O-ring seals (not shown) to insure that the system remains gas-tight and vacuum-tight.

The furnace 26 consists of a water-cooled copper induction coil 46 that is mounted about a generally central section of the fused silica tube 12, as best shown in FIG. 1. The crucible assembly of the furnace consists of a tubular graphite susceptor 48 (FIG. 2) that is encased within a cup-shaped cylindrical jacket 50 of boron nitride. A boron nitride pedestal 52 is seated within the lower end of the graphite susceptor 48, and a cup-shaped crucible 54 that is either made of or lined with boron nitride rests on this pedestal. This assembly is encased within an inner alumina sleeve 56, which in turn is encased within a second, outer alumina shell 58. This assembly is supported upon a zirconia disk 60. This design prevents contact between the graphite susceptor and the zirconia support, which is desirable since these two materials interact at high temperatures.

A dipstick 62 is mounted for up and down vertical movement through an O-ring gland assembly (not shown) in the upper end cap 16. The dipstick 62 is formed of alumina or silicon carbide in the form of a tube or rod. It is attached to a steel rod 66 that extends downwardly into the furnace chamber 10.

The dipstick assembly 36 is attached to the upper brass cap 16 via a tall brass port 34. A brass nut 68 screws into the port 34 and the steel rod 66 slides down the centers of port 34 and nut 68. Between the port 34 and the nut 68 there are disposed two small O-rings (not shown in FIG. 1). When the nut 68 is firmly tightened, these O-rings seal the port 34 and the nut 68 against the steel rod 66 such that the steel rod 66 is immovable, and such that an appropriate vacuum or inert atmosphere can be maintained in the furnace chamber 10. When the brass nut 68 is loosened, the steel rod 66 may be manually moved up and down respectively to withdraw or to insert the dipstick 62 from or into the melt.

To provide a positive gas pressure within the furnace, a length of tubing 70 is connected at one end to the port 22 in the lower end cap 14. The other end of this tubing 70 is connected to one side of a flowmeter valve assembly 72, which is connected to a source of nitrogen under pressure. The flowmeter valve 72 is adjustable so that a slow gas flow into the system can be maintained when desired, as during fiber pulling.

To provide for gas discharge from the system, a discharge line 74 is connected at one of its ends to the port 30 in the upper end cap 16. The tubing 74 is connected at its other end through an outlet valve 75 to a length of discharge conduit 76 that discharges into a trap 78, that in turn is connected through a line 80 to a bubbler 82. The trap 78 is equipped with a glass stopcock 79 for bleeding in air in the event that oil from the bubbler 82 is inadvertently sucked into the trap.

To use this equipment to draw a fiber, coarse chunks of a previously prepared, oxynitride glass are loaded into the boron nitride crucible cup 54. The furnace is then assembled, placed in the chamber 10, and the system is sealed by securing the end cap 16 firmly in place, and tightening the brass nut 68. The system is evacuated through the port 18 in the lower end cap 14. The system is then filled with nitrogen through the port 22. To insure complete removal of oxygen from within the chamber 10, the nitrogen flow is stopped, and the evacuation procedure is repeated. When this second evacuation has been completed, the furnace chamber 10 is again filled with nitrogen. When the nitrogen pressure in the chamber is at approximately 1 atmosphere, the outlet valve 75 is opened to permit gas to escape from the system. The valve on flowmeter 72 is set for a gas flowrate just sufficient to maintain a slight positive gas pressure in the chamber 10; possible oxygen contamination and subsequent oxidation of the graphite susceptor upon loosening the brass nut 68 holding the dipstick are thereby minimized.

Power is applied to the furnace coils 46 and maintained. The furnace design should be such as to permit a rate of increase in the temperature of about 20° C. per minute, within the boron nitride cup 54. When the glass has been completely melted, after attaining a temperature generally in the range of 1500° C. to 1600° C., heating is continued for a period of time to insure equilibration. Because the particular furnace configuration shown and described produces poor blackbody conditions, the reported temperatures are only approximate since they were readings taken on an optical pyrometer. The occurrence of melting, however, is easily confirmed by visual inspection. Melting is accompanied by obvious bubbling, which is outgassing or "fining" of the glass. When this is observed, the furnace temperature is maintained for about 10 minutes until outgassing begins to diminish. The furnace temperature is then lowered about 50° C. to increase the melt viscosity suficiently to allow fiber pulling which is then started.

The invention will now be described in greater detail and demonstrated by specific examples.

EXAMPLES

Three oxynitride glasses, A, B and C (see Table 1, below), were made having the nominal compositions in weight percentages reported in Table 1. These were made by mixing together powdered alumina, silicon nitride, silicon dioxide, and yttrium oxide powders, having the purities and obtained from the sources mentioned above. The powder mixture was compacted by isostatic pressing to form pellets. These pellets were placed in the boron nitride-lined graphite crucibles and melted in a high temperature resistance furnace under the conditions reported in Table 2. Thus, for glass A, the melting temperature was 1600° C.

Melting was achieved by heating the pellets in the furnace for 90 minutes, to bring the pellets from room temperature up to the melting temperature. The rate of temperature increase was maintained so as not to exceed 25° C. per minute and preferably was about 20° l C; per minute or slightly less. The batch of glass A was then held at about 1600° C. for 120 minutes. The temperaure was then lowered as quickly as possible to quench the glass. Although the furnace was programmed to cool to 25° C. in 10 minutes, its characteristics are such that the actual temperature after that time is several hundred °C. That temperature, however, is still low enough to completely quench the glass.

The solidified glass was then gradually heated to the desired annealing temperature, and was held at the annealing temperature of about 700° C. for about 120 minutes. A slow cooling was then begun, to drop from the annealing temperature to about room temperature, over a period of 30 minutes.

Upon cooling, a glass ingot remained in the crucible. To form fibers, pieces cut from the ingot were reheated to form melts. All of these heating and cooling operations were conducted in a nitrogen or argon atmosphere. Once the glass had been remelted and permitted to equilibrate, it was cooled to a slightly lower temperature that was still above the melting temperature. The dipstick 62 was lowered into the melt, and then slowly pulled out. A fiber about 100 mm. long was drawn at the rate of about 20–30 mm./sec. The fiber solidified almost immediately upon removal from the melt. Using the apparatus shown, the length of any individual fiber is limited by the available clearance within the silica tube 12.

After the fiber was drawn, the furnace was cooled to room temperature over a period of about an hour, that is, at a cooling rate of about 25° C. per minute.

The fibers were inspected visually and by optical microscopy. The fiber drawn from glass A was glassy and relatively free from bubbles. It varied in diameter from 0.17 mm. at its tip or lower end, to 2.04 mm. at the end that had been nearest the dipstick.

The fiber compositions were determined, as reported in Table 1. The nominal glass composition reported there is based upon the weight measurements on the components that went into the raw batch mixture. The somewhat different weight percentages reported as analytical are based on actual analyses of bulk glasses. Generally, these determinations track the nominal composition closely.

Other fibers have been drawn from these glasses in both argon and nitrogen, with results similar to those described above and reported in Table 1.

Fibers from glasses A, B and C have also been formed by hand-drawing in air. The procedure employed was relatively simple. The ends of two abutting pieces of glass were heated with an oxyacetylene torch to the melting point. At that temperature, the two abutted glass pieces were quickly pulled apart, with the formation of a fine fiber that interconnected the two glass pieces. Fibers of many different diameters, and up to 500 mm. long, have been drawn in this manner.

TABLE 1

Chemical Analyses of Si—Y—Al—O—N Glasses

| | Composition (in Weight Percent) | | | | | |
|---|---|---|---|---|---|---|
| | A | | B | | C | |
| Element | Nom. | Anal. | Nom. | Anal. | Nom. | Anal. |
| $Al^1$ | 6.0 | 6.5 | 12.6 | 12.7 | 10.0 | N.D. |
| $Si^1$ | 18.9 | 18.0 | 13.2 | 13.2 | 11.8 | N.D. |
| $Y^2$ | 39.8 | 42.6 | 41.5 | 43.0 | 46.9 | N.D. |
| $O^3$ | 32.2 | 29.3 | 26.2 | 24.8 | 26.2 | N.D. |
| $N^4$ | 3.2 | 3.3 | 6.6 | 6.4 | 5.2 | N.D. |
| $Fe^2$ | — | 0.11 | — | 0.13 | — | N.D. |
| $B^2$ | — | trace ~0.1 | — | trace ~0.1 | — | N.D. |

[1] Average of emission and atomic absorption spectroscopies
[2] Emission spectroscopy
[3] Vacuum fusion, precision ± 0.8%
[4] Kjeldahl distillation, precision ± 0.2%
Nom. = Nominal starting composition
Anal. = Analyzed glass composition
N.D. = Not determined

TABLE 2

Temperature Profiles for Preparation of Si—Y—Al—O—N Glasses

| Temperature (°C.) | Time (Mins.) |
|---|---|
| 25° C. to $T_M$ | 90 |
| Hold at $T_M$ | 120 |
| $T_M$ to 25° C. | 10 |
| Hold at 25° | 20 |
| 25° C. to $T_A$ | 30 |
| Hold at $T_A$ | 120 |
| $T_A$ to 25° C. | 30 |

$T_M$ = Melting temperature, 1650° C. for compositions B and C 1600° C. for composition A
$T_A$ = Annealing temperature, 700° C. for compositions A and C 675° C. for composition B

GENERAL

While the examples reported above are concerned with glasses of the system Si—Y—Al—O—N, fiber-making is feasible with a wide variety of oxynitride glass compositions. Suitable compositions have the formulae, for example: Si—M—O—N or Si—M—Al—O—N, where M=Li, Be, Na, Mg, K, Ca, Ti, Zn, Ga, Ge, As, Sr, Y, Zr, Nb, Ba, La, Hf, Pb, Bi, any 4f Rare Earth element, or a combination of two or more of the foregoing elements.

In demonstrating the invention, a manual fiber-drawing technique was described. However, the fibers may be made by other techniques that are used for making oxide glass fibers, including drawing through orifices, steam or air blowing, and the like.

While it is preferred that the fibers be drawn in either a nitrogen atmosphere, or in an inert atmosphere, the fibers can also be drawn in air. The kinetics of the drawing process are apparently such as to prevent substantial nitrogen loss from the fiber by oxidation or by thermal decomposition.

The properties of the oxynitride glass fibers generally are superior. The properties of those oxynitride glass fibers specifically described herein are superior in every important respect to those of any known glass fibers. Thus, their elastic modulus values, 140 GPa to 185 GPa, are higher than the highest reported for any bulk oxide glass, 110 GPa to 115 GPa, and far higher than typical values for commercial glass fibers, which generally are 70 GPa or less. This exceptional stiffness is a critically important property for a reinforcing fiber. When these superior elastic modulus properties are considered with the superior resistance to corrosion of oxynitride glasses in the presence of water, which has been demonstrated to be at least twice as good as oxide glasses, oxynitride glass fibers make outstanding candidates for composite applications. Oxynitride glasses are also harder and stronger than any known oxide glasses, which properties are also desirable for reinforcing fibers.

Both alumina and silicon carbide dispsticks are useful in fiber pulling. Alumina is preferred at present.

While it might be expected that fibers drawn in air might lose nitrogen because of oxidation, it has been demonstrated that fibers drawn from glass C, drawn in air, do contain significant amounts of nitrogen. This was proven by x-ray diffraction on glass C fibers that had been crystallized by heating in nitrogen at 1300° C. for four hours. Phases found in the crystallized fibers, yttrium aluminum garnet, $Y_3Al_5O_{12}$, and the "H" phase, $Y_5(SiO_4)_3N$, were the same, and qualitatively in the same amounts, as were found in the as-prepared glass ingot crystallized in the same manner.

Another glass of different composition, D, Table 3 below, was prepared as a part of an evaluation of the leaching behavior of oxynitride glasses, and thus of their corrosion resistance. Glass compositions A and B, Table 1 above, were also utilized in this evaluation.

TABLE 3

| Chemical Analysis of Glass D | | |
|---|---|---|
| Element | Nom. | Analysis |
| Al[1] | 9.1 | 9.6 |
| Si[1] | 14.3 | 14.3 |
| Y[2] | 45.1 | 45.4 |
| O[3] | 24.4 | 23.1 |
| N[4] | 7.1 | 7.2 |
| Fe[2] | — | 0.09 |
| B[2] | — | ~0.1 (all trace levels) |

[1]Average of emission and atomic adsorption spectroscopies
[2]Emission spectroscopy
[3]Vacuum fusion, precision = 0.8%
[4]Kjeldahl distillation, precision ± 0.2%

Glass D was prepared from oxide and nitride starting materials following generally the procedure described above. That is, the materials were blended, preslugged, and melted between 1650°–1700° C. in BN-lined crucibles in an atmosphere of nitrogen. Since all of the oxides in all of the glass batches described herein were of high purity (99.5% or higher), the iron contamination must have come from the silicon nitride powder used as the nitrogen-containing component. The low levels of boron indicate that minimal interaction occurred between the glasses and BN crucibles during melting.

Each of the oxynitride glass compositions evaluated lost less weight than either silica glass or crystalline quartz, in this leaching evaluation. From the data (comparing the three different compositions leached at 200° C.) it might also be concluded that there is no systematic trend in the degree of leaching with nitrogen content. However, weight loss alone is insufficient to characterize the total leaching process. In terms of silicon release, the oxynitride glasses are at least a factor of two more durable than either silica glass or crystalline quartz.

The leaching process in silicate glasses may be described in terms of solvent attack of Si-O bonds (hydrolysis) to form localized anionic silicate groups which are slowly released to the solution and thereby corroding the surface. In oxynitride glasses, it has been reported that nitrogen substitutes for oxygen in the structural framework allowing for increased crosslinking of the network through Si—N—Si interactions. This increased crosslinking may have improved leach resistance by greatly reducing the hydrolysis reaction. The effect of yttrium and aluminum on leaching in these glasses, however, should also be considered in light of the known positive effects each has on leach resistance.

In studies of soda-lime-silica glasses for solar applications, it has been reported that very low concentrations of rare earth can greatly inhibit glass/water interactions. The incorporation of alumina in silicate glasses can also increase the chemical durability of glass. Although increased leach resistance is generally associated with rare earth and aluminum incorporation in the glass system, the magnitude of the leaching effect when compared to fused silica glass is not as great as was noted in the evaluation described above. This conclusion would lead to the belief that the high leach resistance noted must be due for the major part to the increased structural integrity resulting from nitrogen incorporation in the structural framework.

CONCLUSION

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A fiber drawn from an oxynitride glass, said fiber having an elastic modulus in the range from 140 GPa to 185 GPa, wherein said fiber comprises up to 15 atomic percent nitrogen.

2. A fiber according to claim 1 wherein the glass is a Si—Y—Al—O—N glass.

3. A fiber according to claim 2 that is formed from a raw batch powder mixture of $Al_2O_3$, $Si_3N_4$, $SiO_2$, and $Y_2O_3$.

4. A fiber according to claim 2 that is formed from a raw batch powder mixture of AlN, $SiO_2$, and $Y_2O_3$.

5. A fiber according to claim 1 wherein said fiber has a diameter in the range from 0.17 mm at a first end to 2.04 mm at a second end.

* * * * *